United States Patent
Fadlovich et al.

(10) Patent No.: US 12,521,868 B2
(45) Date of Patent: Jan. 13, 2026

(54) APPARATUSES AND PROCESSES FOR WORKING ON A PART

(71) Applicants: Airbus Operations GmbH, Hamburg (DE); Airbus Operations S.L.U., Getafe (ES)

(72) Inventors: Chace Fadlovich, Mukilteo, WA (US); Michael Woogerd, Mukilteo, WA (US); Eric Pospisil, Mukilteo, WA (US); Mike Grimstad, Mukilteo, WA (US); Joseph Berry, Mukilteo, WA (US); Juan Francisco Garcia Amado, Getafe (ES)

(73) Assignees: Airbus Operations GmbH, Hamburg (DE); Airbus Operations S.L.U., Getafe (ES)

( * ) Notice: Subject to any disclaimer, the term of this patent is extended or adjusted under 35 U.S.C. 154(b) by 350 days.

(21) Appl. No.: 18/194,027

(22) Filed: Mar. 31, 2023

(65) Prior Publication Data
US 2024/0326235 A1    Oct. 3, 2024

(51) Int. Cl.
*B25J 5/04* (2006.01)
*B23Q 7/00* (2006.01)
*B64F 5/10* (2017.01)

(52) U.S. Cl.
CPC .............. *B25J 5/04* (2013.01); *B23Q 7/001* (2013.01); *B64F 5/10* (2017.01)

(58) Field of Classification Search
CPC ... B25J 5/04; B25J 9/026; B25J 9/041; B23Q 7/001; B64F 5/10; B66C 7/12; B66C 7/14
USPC .............................. 104/98; 212/316; 414/728
See application file for complete search history.

(56) References Cited

U.S. PATENT DOCUMENTS

| | | | |
|---|---|---|---|
| 6,098,260 A * | 8/2000 | Sarh | B64F 5/10 227/52 |
| 10,315,255 B2 | 6/2019 | Albert et al. | |
| 10,500,710 B2 | 12/2019 | Albert et al. | |
| 2006/0068109 A1 | 3/2006 | Frankenberger et al. | |
| 2009/0143207 A1* | 6/2009 | Wampler | B25J 19/0029 483/51 |

(Continued)

FOREIGN PATENT DOCUMENTS

| | | | |
|---|---|---|---|
| CN | 107499530 A * | 12/2017 | ............. B23P 15/00 |
| EP | 0341134 A1 | 11/1989 | |

(Continued)

OTHER PUBLICATIONS

Tadviser, Xyrec, Airbus Group, 2019 Announcement, Automated Paint Robot, https://tadviser.com/index.php/Product:Automated_Paint_Robot_%28APR%29.

(Continued)

*Primary Examiner* — Saul Rodriguez
*Assistant Examiner* — Brendan P Tighe
(74) *Attorney, Agent, or Firm* — Greer, Burns & Crain, Ltd.

(57) ABSTRACT

An apparatus for performing operations on a part, and in particular on the fuselage of an aircraft. The apparatus utilizes movable arches which carry an and effector and which move along a track fixed to a structure. Additional, fixed arches are positioned at specific longitudinal positions and when the movable arches are aligned with the fixed arches, the end effector may move from the movable arch to the fixed arch.

19 Claims, 5 Drawing Sheets

(56) References Cited

U.S. PATENT DOCUMENTS

| | | | | |
|---|---|---|---|---|
| 2013/0185925 A1* | 7/2013 | Sarh | ............... | B21J 15/105 |
| | | | | 29/283 |
| 2014/0088613 A1* | 3/2014 | Seo | ............... | A61B 34/32 |
| | | | | 606/130 |
| 2018/0126514 A1* | 5/2018 | Moriarty | ............... | B24B 19/26 |
| 2019/0002130 A1* | 1/2019 | Whitlaw | ............... | B25J 9/0036 |
| 2022/0153432 A1* | 5/2022 | Chan | ............... | B64F 5/10 |
| 2024/0327035 A1* | 10/2024 | Fadlovich | ............... | B64F 5/10 |

FOREIGN PATENT DOCUMENTS

| | | | |
|---|---|---|---|
| FR | 3060429 | A1 | 6/2018 |
| FR | 3061054 | A1 | 6/2018 |

OTHER PUBLICATIONS

Felix Von Drigalski and Airbus Group, Winning team story: The ups and downs of building a drilling robot for the Airbus Shopfloor Challenge, Jun. 1, 2016, https://robohub.org/winning-team-story-the-ups-and-downs-of-building-a-drilling-robot-for-the-airbus-shopfloor-challenge/.

Age Fotostock, Oct. 1, 2019, https://www.agefotostock.fr/age/fr/informations-photo-d'actualit%C3%A9/01-octobre-2019-hambourg-deux-robot-percer-cadre-rivet-nouveau-structurel-assemblage-airbus-a320-famille-hangar-245-airbus-plante/PAH-191001-99-112706-dpai.

Dr. Jody Muelaner, Sep. 24, 2020, Feature: Robots take on more aerospace tasks thanks to accuracy boost, https://www.imeche.org/news/news-article/feature-robots-take-on-more-aerospace-tasks-thanks-to-accuracy-boost.

\* cited by examiner

APPARATUSES AND PROCESSES FOR WORKING ON A PART

FIELD OF THE INVENTION

This invention relates generally to processes and devices for working on parts, and more particularly to processes and devices that position end effectors relative to the part to perform the operations.

BACKGROUND OF THE INVENTION

In order to carry out certain operations with an end effector, like drilling and riveting, on an aircraft fuselage, the end effector must be positioned in a desired location. These operations could be carried out by an operator or individual. However, in order to carry out these drilling operations or other simple machining operations on assemblies with large sizes, rapidly and with precision, devices have nevertheless been developed in order to at least partially automate these operations.

For example, a device is known which uses two parallel flexible rails which are secured on the structure to be machined. The rails are secured on the structure by suction. An end effector, for example a drill, is moved along the two rails. While presumably effective for its intended purpose, a device of this type is complicated and time consuming to implement. In addition, in terms of construction, the width between the two rails and the surface which can be reached by the machining tool are limited.

Therefore, it would be desirable to provide an apparatus which allows for the desired operations to be performed, which does not suffer from one or more of these drawbacks.

SUMMARY

A new apparatus for performing operations on a part, and in particular on the fuselage of an aircraft has been invented. The device utilizes a track with fixed rails on opposites sides of the part. One or more end effectors are mounted on arched beams, or aches, which extend between the fixed rails and which can moved to a desired longitudinal location. The arched beams are upper arch beams passing over the upper portion of the part. This allows the arch beams to move unimpeded by supports or other structures that are located below the part and which support the part. One more lower arches may be positioned at specific longitudinal locations. The upper arch can be moved to the corresponding location of the lower arch and, once the arches are aligned, the end effector can move from the upper arch to the lower arch to perform operations on the lower portion of the part. Once completed, the end effector may move back to the first, or upper arch.

Therefore, the present invention may be characterized, in at least one aspect, as providing an apparatus for performing an operation on a part. The apparatus may include a track extending in direction parallel with a longitudinal axis of the part, a first arch mounted to the track, the first arch configured to move along the track to a longitudinal position, an end effector associated with the first arch, the end effector configured to move circumferentially around the longitudinal axis of the part; and, a means for moving the first arch, the means for moving mounted to as to move with the arch.

Each arch may be formed from two parallel arches. The end effector may be mounted on a platform that extends between the two parallel arches of the first arch.

The track may include two rails located on opposite sides of the part. The arch may extend between the two rails of the track.

The apparatus may further include a second arch mounted to the track in a fixed longitudinal position. The end effector is configured to move from the first arch to the second arch when the first arch is positioned at the fixed longitudinal position.

The second arch and the first arch together may form a complete circle around the part. Alternatively, the second arch and the first arch together may form less than a complete circle around the part.

The first arch may include an extension having an engagement surface, and the second arch may include a latch an engagement surface configured complementarily to the engagement surface of the extension. The engagement surface of the extension may be a T-shape. The extension may be configured to be moved so as to allow the engagement surface of the extension to engage with the engagement surface of the latch. One of the first arch and the second arch may include an indexing feature configured to position the first and second arches together. The indexing feature may be a protrusion which may have a slanted surface.

The apparatus may further include a third arch mounted to the track in a fixed longitudinal position. The end effector may be configured to move from the first arch to the third arch when the first arch is positioned at the fixed longitudinal position of the third arch. The second arch and the first arch together may form a complete circle around the part, and the third arch and the first arch together may form less than a complete circle around the part.

The first arch may be an upper arch and the second arch may be a lower arch. The device may include a second upper arch.

In another aspect, the present invention may also be generally characterized as providing a process for performing an operation on a part by: moving a first arch along a track to a desired longitudinal position, the track extending in a direction parallel with a longitudinal axis of the part, wherein the desired position coincides with a second arch fixed longitudinally relative to the desired longitudinal position; and, moving an end effector circumferentially around the longitudinal axis of the part from the first arch to the second arch.

The process may include engaging an extension on the first arch with a latch on the second arch.

Additionally, one of the first arch or the second arch may include a protrusion configured to align the first arch with the second arch.

Additional aspects, embodiments, and details of the invention, all of which may be combinable in any manner, are set forth in the following detailed description of the invention.

BRIEF DESCRIPTION OF THE DRAWINGS

One or more exemplary embodiments of the present invention will be described below in conjunction with the following drawing figures, in which.

DETAILED DESCRIPTION

For performing operations on a part, an apparatus according to the present disclosure utilizes arches extending between fixed beams. Some of the arms are moveable, longitudinally, allowing end effectors to be positioned at a desired location. Additionally, arches are provided in fixed positions. When it is desired to perform operations using the fixed arches, a movable arch is positioned at the fixed arch, and brought into engagement therewith. This allows the end effector to move to the fixed arch. Compared with other movement systems, the present movement system allows for fixed rails to be used that are not attached to the part. Additionally, it avoids the supports that hold up the part.

With these general principles in mind, one or more embodiments of the present invention will be described with the understanding that the following description is not intended to be limiting.

Figure 1:
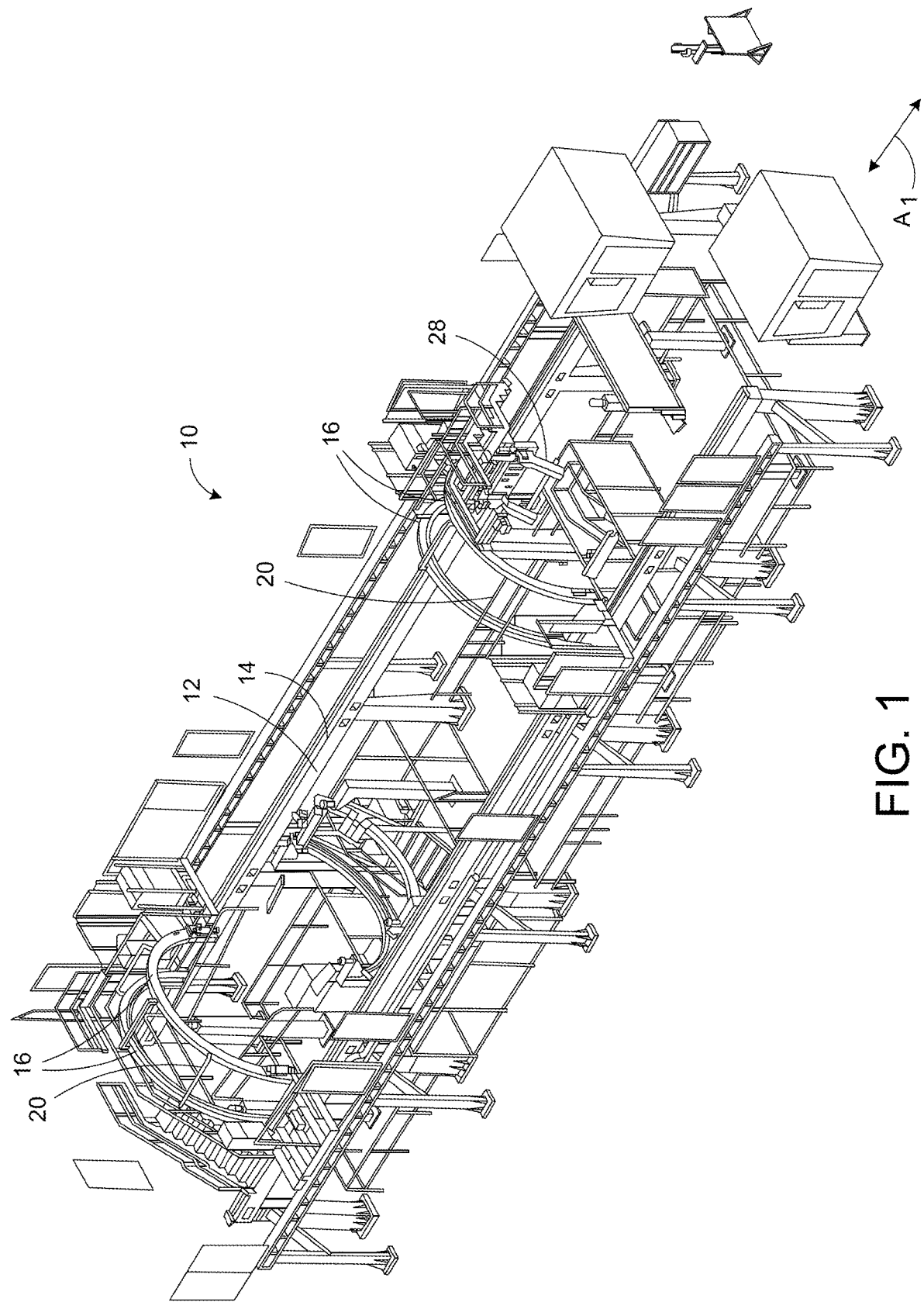
FIG. 1 is a schematic, top and side view of an apparatus according to one or more aspects of the present invention.
Figure 2:
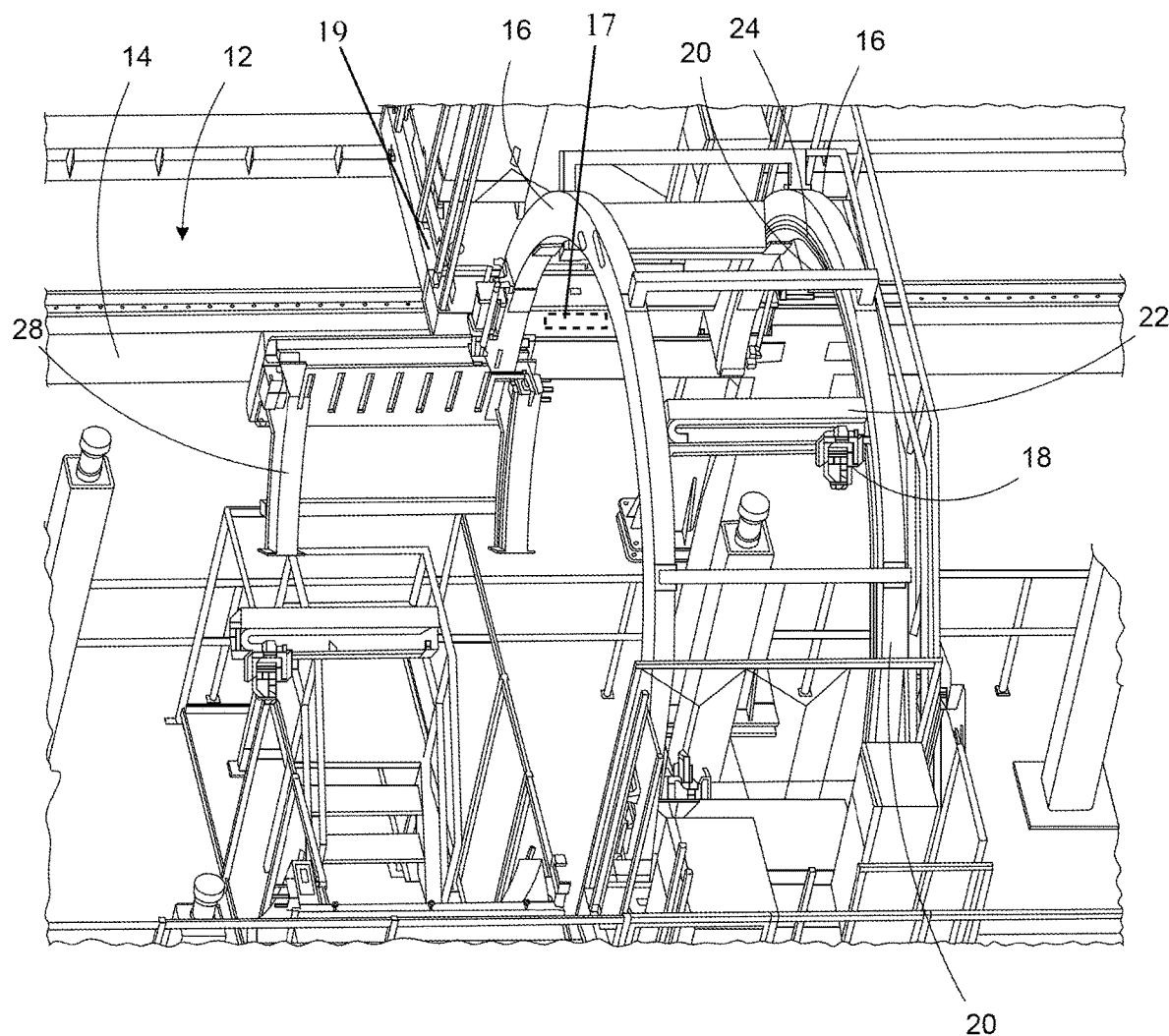
FIG. 2 is a top and side close up view of arches in the apparatus shown in FIG. 1.

In FIGS. 1 and 2, an apparatus 10 for performing operations on a part, such as an aircraft fuselage, includes a track 12 extending in direction parallel with a longitudinal axis A1 of the part. The track 12 preferably includes two rails 14 on opposite sides of the longitudinal axis A1. The rails 14, and thus the track 12, are fixed to a permanent support supporting structure. By "permanent" it is meant that the rails 14 are not affixed, attached, otherwise supported by the part.

One or more movable arched beams, or arches, 16 are mounted to the track 12, and extend between the rails 14 by a means 17 for moving the arch 16. For example, the means 17 for moving the arch may be a motor having a gear which engages with a track 12. As the motor turns the gear, the arch 16 may to move along the longitudinal axis A1. The direction of movement will depend on the direction of rotation of the gear. The motor means 17 may be mounted to platform 19 configured to be moved with the arch 16 and which may be used to support controllers, power sources, and other components associated with the apparatus 10.

Specifically, the movable arches 16 are configured to move along the track 12 and be positioned in a desired longitudinal location at which an end effector 18 is able to perform the operation on the part. For example, the end effector 18 may be configured to perform an operation, like drilling, or riveting. In addition to drilling or riveting, the end effectors 18 could be sprayers, for painting or coating, or distance sensors for measuring.

In the depicted embodiment, the arches 16 are provided in pairs with supports 20 extending therebetween. The end effector 18 may be mounted to a platform 22 or trolley that extends between the arches 16 in a particular pair. This may allow the end effector 18 to have additional longitudinal movement. Additionally, the arches 16 include geared tracks 24 that allow the end effector 18 to move circumferentially around the longitudinal axis A1 (i.e., along the arch 16).

Accordingly, the end effector 18, thanks to the longitudinal movement of the arch 16 may obtain the desired longitudinal position for performing the operation. The end effector 18 may also obtain the desired circumferential position based on moving along the arch 16. The end effector 18 may also have a radial movement, for example as part of the end effector 18 itself may extend (drill extending) or the end effector 18 may be mounted to an arm that may allow movement in the radial direction.

The movable arches 16 are upper arches, allowing them to move freely along the longitudinal axis A1 without regard to supports and other equipment or devices located below the part. However, there is occasionally a need for the end effector 18 to perform the operation on the underside of the part. Accordingly, at specific locations, fixed arches 26, 28 may be provided. As will be described below, there may be some movement associated with these "fixed" arches 26, 28, but the longitudinal positioning of these arches 26, 28 does not change. Hence, they are deemed to be "fixed" arches 26, 28. In the manufacturing of items repeatedly, it is known where there is a need for the end effector to be used on the underside of the part. Thus, the location of the fixed arches can be determined.

Accordingly, when the movable arch 16 is positioned at the position of a fixed arch arches 26, 28, the end effector 18 moves from the moveable arch 16 to the fixed arch 26, 28. In some instances, the fixed arch 26 and the movable arch 16 may form a complete circle. Alternatively, the fixed arch 28 may only form part of a circle with the movable arch 16. This is particularly useful when the end effector 18 only needs to go a small distance circumferentially lower than the movable arch 16 allows.

Figure 3:
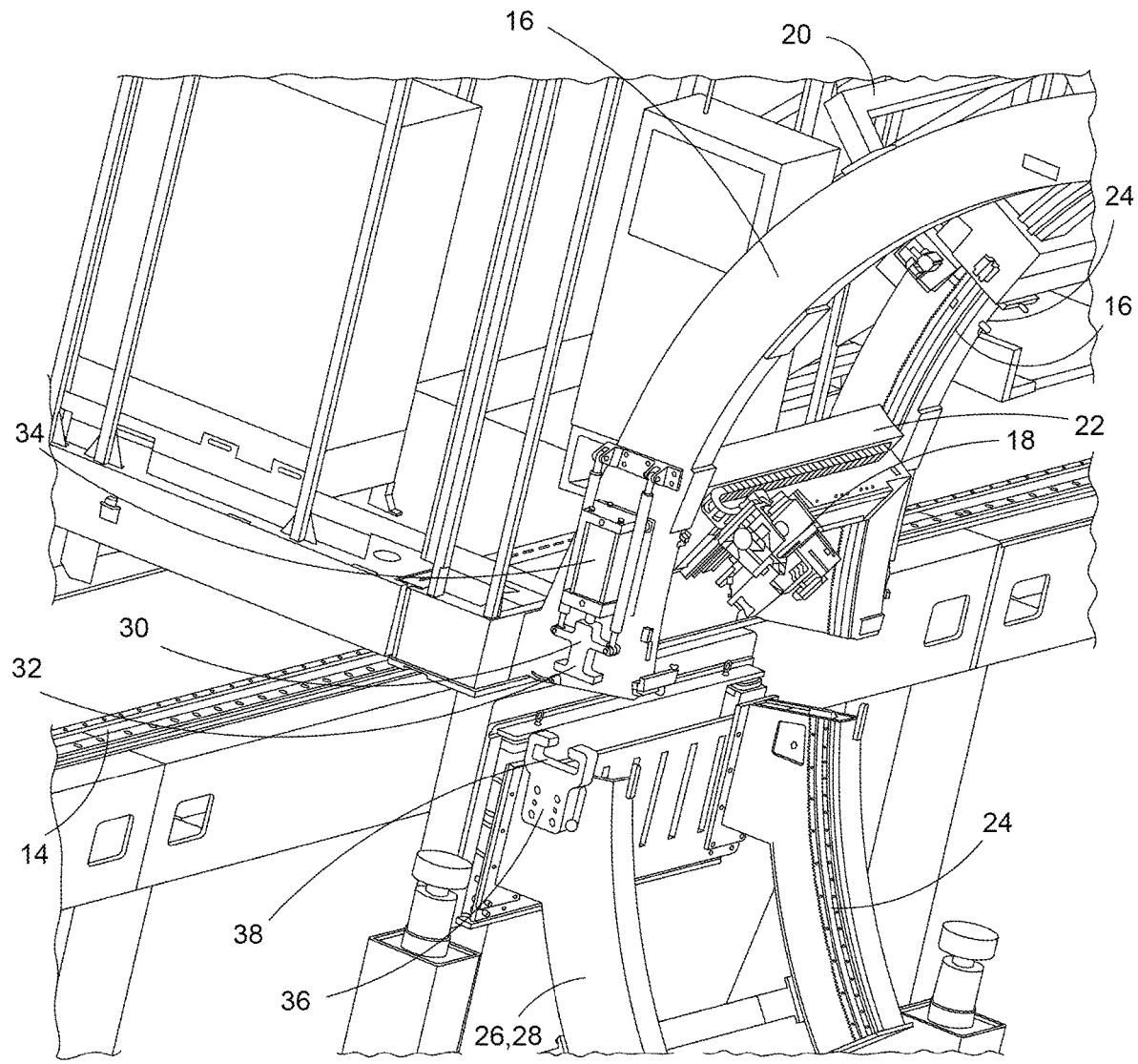
FIG. 3 is a side view of a portion of the arches in the apparatus shown in FIG. 1.
Figure 4:
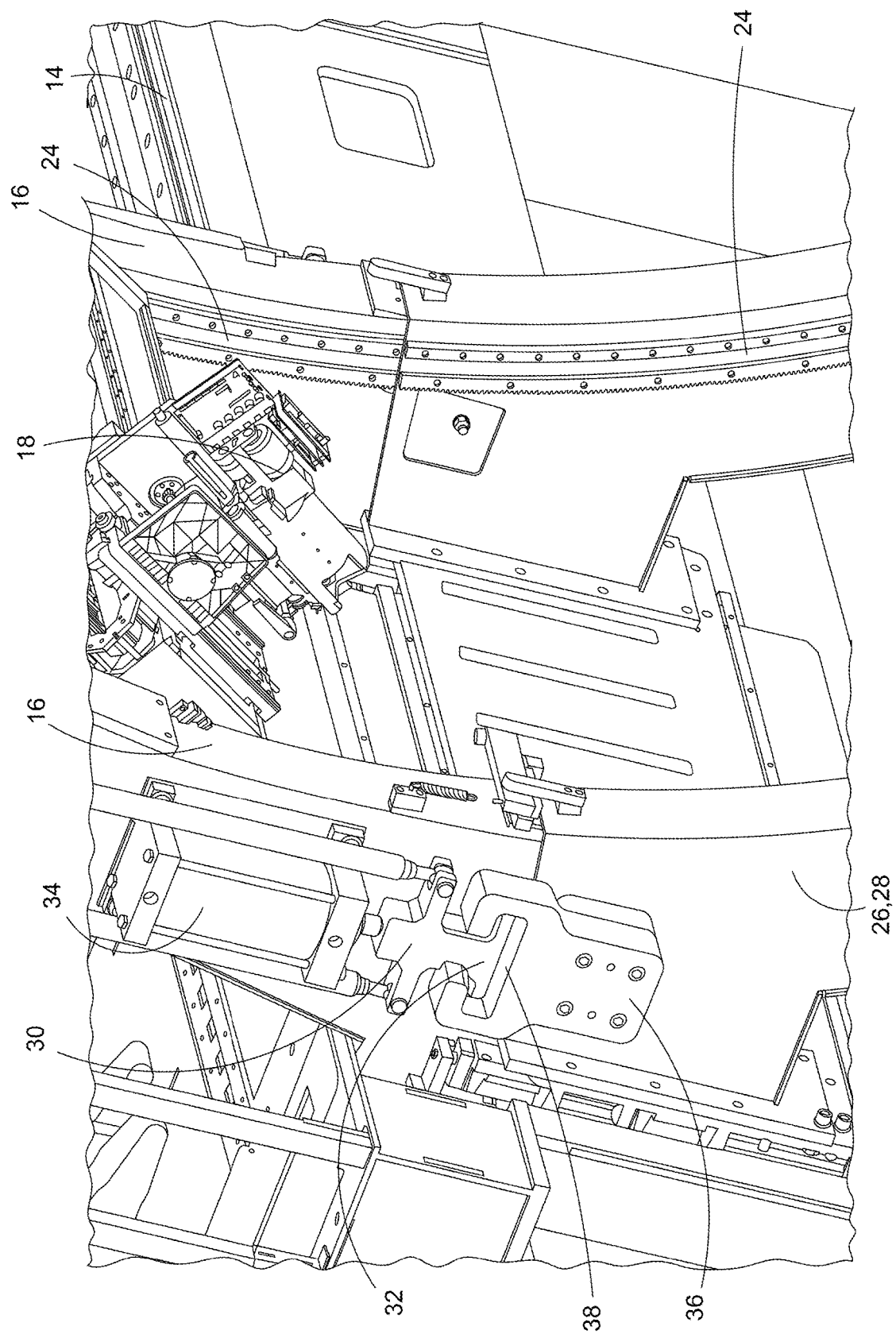
FIG. 4 is a side view of a portion of the arches in the apparatus shown in FIG. 1 in which the arches are engaged with each other; and, FIG. 5 is a side view of an indexing feature according to one or more aspects of the present invention.
Figure 5:
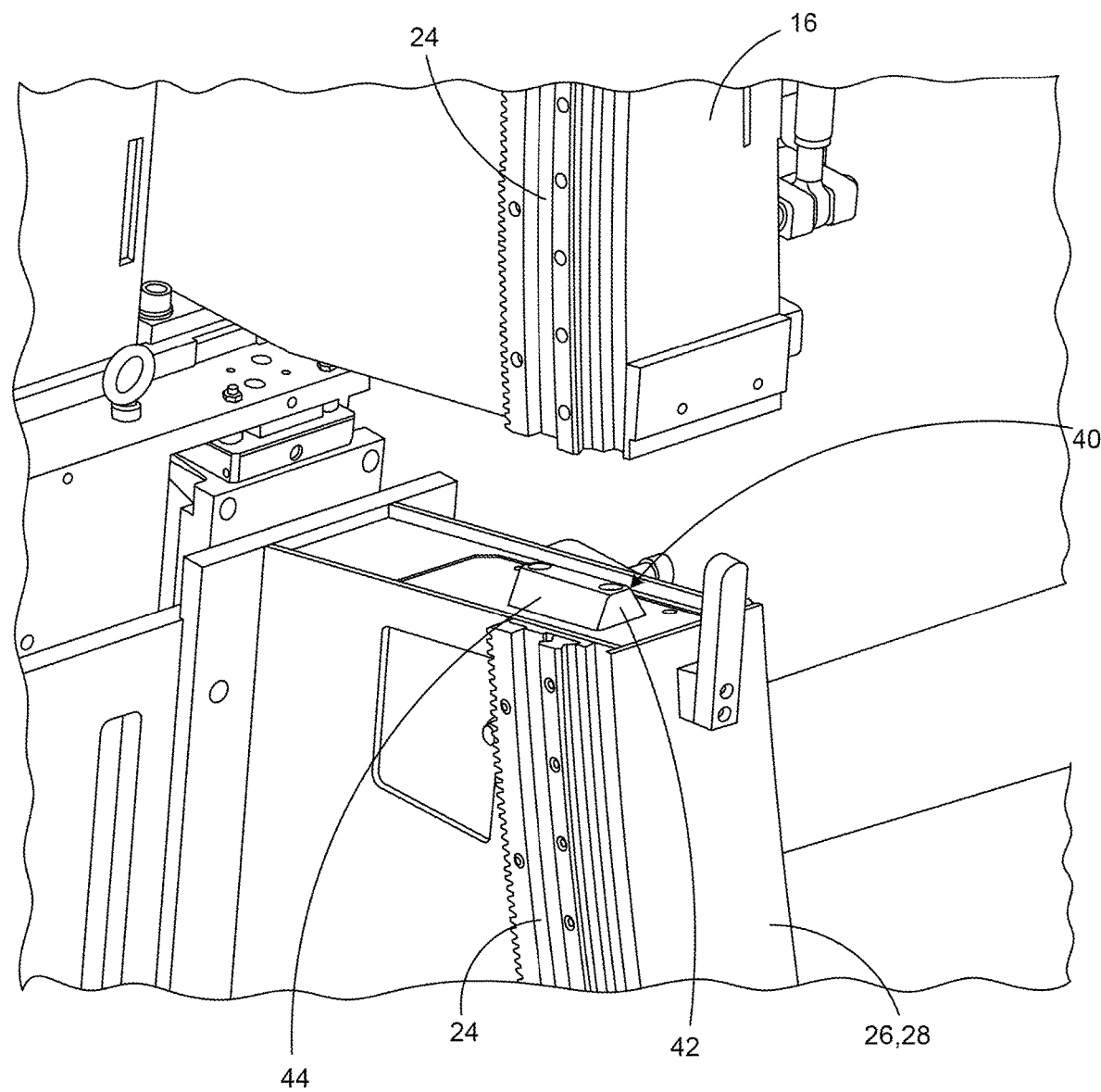

Turning to FIGS. 3 to 5, in order to ensure proper alignment of the movable arch 16 with the fixed arch 26, 28 when the end effector 18 is to be moved, the movable arch 16 may include an extension 30 having an engagement surface, for example a T-shape 32. The extension 30 may be movable with for example a piston 34. The fixed arch 26, 28 may include a latch 36 having an engagement surface, such as an orifice 38, configured complementarily to the engagement surface of the extension 30.

In use, the piston 34 may being extending, resulting in the extension 30 moving towards the fixed arch 26, 28. Once the extension 30 has been lowered, the movable arch 18 may be moved longitudinally, so that the T-shape 32 of the extension 30 slides into the orifice 38 of the latch 36. Once engaged as such, the piston 34 can be retracted. The retraction of the piston 34 will cause the fixed arch 26, 28 to be pulled upward towards the movable arch 16.

In order to further align the movable arch 16 and the fixed arch 26, 28, as shown in FIG. 5, one of the arches 16, 26, 28, may include an indexing feature 40 which will guide the fixed arch 26, 28, to the appropriate position. The indexing feature 40 may be a protrusion 42 with one or more slanted surfaces 44 that is configured to be received in a correspondingly shaped aperture (not shown). Thus, as the two arches 16, 26, 28 are brought together, the slanted surface 44 will be forced by the correspondingly shaped aperture to the correct, or proper, position.

Once in the correct position, see FIG. 4, the geared tracks 24 on the movable arch 16 and the geared tracks 24 on the fixed arch 26, 28 will be aligned, allowing the end effector 18 (or the trolley 22) to travel between the aligned arches 16, 26, 28. To disengage the aligned arches 16, 26, 28, the opposite procedure may be followed.

Thus, in a process for performing an operation on a part according to the present invention, a first arch 16 is moved along a track 12 to a desired longitudinal position. The track 12 extends in a direction generally parallel (+/−30 degrees) with a longitudinal axis A1 of the part. The desired position coincides with a second arch 26, 28 fixed longitudinally relative to the desired longitudinal position. An end effector 18 may be moved circumferentially around the longitudinal axis of the part from the first arch 16 to the second arch 26, 28 when desired and when the arches are aligned.

As will be appreciated, the present apparatus provides for precise, repeatable positioning for end effectors configured to perform operations on a part. The movable arches avoid supports and other devices and equipment located below the part. This allows for increased productivity. When use of the end effectors on the lower part is desired, fixed arches may be used which can receive the end effectors from the movable arches.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. An apparatus for performing an operation on a part, the apparatus comprising:
   a track extending in direction parallel with a longitudinal axis of the part;
   a first arch mounted to the track, the first arch configured to move along the track to a longitudinal position;
   at least one end effector associated with the first arch, the at least one end effector configured to move circumferentially around the longitudinal axis of the part;
   a means for moving the first arch, the means for moving mounted to as to move with the first arch, and
   a second arch mounted to the track in a fixed longitudinal position, wherein the end effector is configured to move from the first arch to the second arch when the first arch is positioned at the fixed longitudinal position.

2. The apparatus of claim 1, wherein the first arch is formed from two parallel arches.

3. The apparatus of claim 2, wherein the end effector is mounted on a platform that extends between the two parallel arches of the first arch.

4. The apparatus of claim 1, wherein the track comprises two rails located on opposite sides of the part.

5. The apparatus of claim 4, wherein the first arch extends between the two rails of the track.

6. The apparatus of claim 1, wherein the second arch and the first arch together form less than a complete circle around the part.

7. The apparatus of claim 1, wherein the first arch comprises an extension having an engagement surface, and wherein the second arch comprises a latch with an engagement surface configured complementarily to the engagement surface of the extension.

8. The apparatus of claim 7, wherein the engagement surface of the extension comprises a T-shape.

9. The apparatus of claim 7, wherein the extension is configured to be moved so as to allow the engagement surface of the extension to engage with the engagement surface of the latch.

10. The apparatus of claim 9, wherein one of the first arch and the second arch comprises an indexing feature configured to position the first and second arches together.

11. The apparatus of claim 10, wherein the indexing feature comprises a protrusion.

12. The apparatus of claim 11, wherein the protrusion comprises a slanted surface.

13. The apparatus of claim 1, further comprising a third arch mounted to the track in a fixed longitudinal position, wherein the at least one end effector is configured to move from the first arch to the third arch when the first arch is positioned at the fixed longitudinal position of the third arch.

14. The apparatus of claim 13, wherein the second arch and the first arch together form a complete circle around the part, and, wherein the third arch and the first arch together form less than a complete circle around the part.

15. The apparatus of claim 1, wherein the first arch is an upper arch and wherein the second arch is a lower arch.

16. The apparatus of claim 15, further comprising a second upper arch.

17. A process for performing an operation on a part, the process comprising:
   moving a first arch, which is mounted to a track, along the track to a desired longitudinal position, the track extending in a direction parallel with a longitudinal axis of the part, wherein the desired longitudinal position coincides with a second arch which is mounted to the track and is fixed longitudinally relative to the desired longitudinal position on the track; and,
   moving at least one end effector circumferentially around the longitudinal axis of the part from the first arch to the second arch, wherein the at least one end effector is associated with the first arch, and is configured to move from the first arch to the second arch when the first arch is positioned at the fixed longitudinal position.

18. The process of claim 17 further comprising:
   engaging an extension on the first arch with a latch on the second arch.

19. The process of claim 17 wherein one of the first arch or the second arch comprises a protrusion configured to align the first arch with the second arch.

* * * * *